US012299601B2

(12) United States Patent
Lu et al.

(10) Patent No.: US 12,299,601 B2
(45) Date of Patent: May 13, 2025

(54) VECTOR ALIGNMENT OF SIGNAL LAG

(71) Applicant: International Business Machines Corporation, Armonk, NY (US)

(72) Inventors: Shuyan Lu, Cary, NC (US); Yi-Hui Ma, Mechanicsburg, PA (US); Eugene Irving Kelton, Wake Forest, NC (US); John H. Walczyk, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 17/140,192

(22) Filed: Jan. 4, 2021

(65) Prior Publication Data

US 2022/0215278 A1    Jul. 7, 2022

(51) Int. Cl.
  *G06N 5/04*       (2023.01)
  *G06F 18/2413*    (2023.01)
  *G06N 5/047*      (2023.01)
  *G06Q 40/02*      (2023.01)

(52) U.S. Cl.
  CPC ......... *G06N 5/047* (2013.01); *G06F 18/2413* (2023.01); *G06Q 40/02* (2013.01)

(58) Field of Classification Search
  CPC ..... G06N 5/047; G06F 18/2413; G06Q 40/02
  USPC .......................................................... 705/35
  See application file for complete search history.

(56) References Cited

U.S. PATENT DOCUMENTS

| 10,827,039 B1 | 11/2020 | Dandekar |
| 2006/0116920 A1 | 6/2006 | Shan |
| 2006/0212487 A1 | 9/2006 | Kennis |
| 2007/0061211 A1 | 3/2007 | Ramer |
| 2009/0018798 A1 | 1/2009 | Dorneich |

(Continued)

FOREIGN PATENT DOCUMENTS

| CN | 110197374 A | 9/2019 |
| WO | 02/06474 A1 | 1/2002 |
| WO | 02046474 A3 | 6/2002 |

OTHER PUBLICATIONS

Lu et al., "Removal of Transaction Noise", U.S. Appl. No. 17/140,203, filed Jan. 4, 2021, 23 pages.

(Continued)

*Primary Examiner* — Hai Tran
(74) *Attorney, Agent, or Firm* — Stosch Sabo; Andrew D. Wright; Calderon Safran & Wright P.C.

(57) ABSTRACT

Embodiments of the present invention provide a computer system, a computer program product, and a method that comprises receiving transactional data from at least two users in a plurality of users; determining a pattern within the received transactional data based on a frequency-based domain conversion, wherein the pattern is associated with a determined periodicity; determining a delay within the received transactional data by identifying contextual factors associated with the received transactional data and measuring an amount of time between each identified contextual factors within a plurality of identified contextual factors using a signal processing algorithm; aligning the received transactional data from the at least two users by placing at least two signal forms associated based on the determined delay within the received transactional data at a same point; and generating a line graph depicting the aligned transactional data.

17 Claims, 4 Drawing Sheets

(56) References Cited

U.S. PATENT DOCUMENTS

| | | |
|---|---|---|
| 2011/0055072 A1 | 3/2011 | Lee et al. |
| 2011/0055852 A1 | 3/2011 | Smith et al. |
| 2011/0131122 A1 | 6/2011 | Griffin |
| 2011/0251951 A1 | 10/2011 | Kolkowitz et al. |
| 2013/0036037 A1 | 2/2013 | Meredith |
| 2015/0039512 A1* | 2/2015 | Adjaoute ............ G06Q 20/384 705/44 |
| 2015/0178825 A1 | 6/2015 | Huerta |
| 2015/0317281 A1* | 11/2015 | Sharifi ................... G06F 17/15 708/422 |
| 2017/0011382 A1 | 1/2017 | Zoldi |
| 2017/0364851 A1* | 12/2017 | Maheshwari .... G06Q 10/06314 |
| 2018/0293377 A1 | 10/2018 | Tomonaga |
| 2018/0351786 A1* | 12/2018 | Pope .................. H04L 41/0654 |
| 2019/0259033 A1 | 8/2019 | Reddy et al. |
| 2019/0311367 A1 | 10/2019 | Reddy |
| 2019/0349426 A1 | 11/2019 | Smith |
| 2021/0312450 A1 | 10/2021 | Allbright |
| 2022/0050728 A1 | 2/2022 | Foster, II |
| 2022/0215006 A1 | 7/2022 | Lu |
| 2022/0215278 A1 | 7/2022 | Lu |
| 2022/0237516 A1 | 7/2022 | Schmidt |

OTHER PUBLICATIONS

Appendix P—List of IBM Patents or Patent Applications Treated as Related, Filed herewith, 2 Pages.

Tianqing, Zhu, "Suspicious Financial Transaction Detection Based on Empirical Mode Decomposition Method", Proceedings of the 2006 IEEE Asia-Pacific Conference on Services Computing (APSCC'06), © 2006 IEEE, 5 pages.

Lu et al., "Scaling Transactions With Signal Analysis", U.S. Appl. No. 17/064,627, filed Oct. 7, 20, 23 pages.

Final Office Action dated Apr. 4, 2024 in related U.S. Appl. No. 17/064,627, 11 pages.

* cited by examiner

VECTOR ALIGNMENT OF SIGNAL LAG

BACKGROUND

The present invention relates generally to the field of data pipeline technology, and more specifically data cleaning technology within data pipeline technology.

A data pipeline is a series of steps that moves data through a process. The output of a preceding step in the process becomes the input of the subsequent step. Data, typically raw data, goes in one side, goes through a series of steps, and then pops out the other end ready for use or already analyzed. The steps of a data pipeline can include cleaning, transforming, merging, modeling, and more, in any combination. Depending on the level of complexity associated with the data, these data pipelines may be simple and may become highly complex.

Data cleaning is the process of detecting and correcting (or removing) corrupt or inaccurate records from a record set, table, or database and refers to identifying incomplete, incorrect, inaccurate or irrelevant parts of the data and then replacing, modifying, or deleting the dirty or coarse data. Data cleansing may be performed interactively with data wrangling tools, or as batch processing through scripting. After cleansing, a data set should be consistent with other similar data sets in the system. The inconsistencies detected or removed may have been originally caused by user entry errors, by corruption in transmission or storage, or by different data dictionary definitions of similar entities in different stores. Data cleaning differs from data validation in that validation almost invariably means data is rejected from the system at entry and is performed at the time of entry, rather than on batches of data.

The actual process of data cleansing may involve removing typographical errors or validating and correcting values against a known list of entities. The validation may be strict (such as rejecting any address that does not have a valid postal code) or fuzzy (such as correcting records that partially match existing, known records.) Some data cleansing solutions will clean data by cross-checking with a validated data set. A common data cleansing practice is data enhancement, where data is made more complete by adding related information. For example, appending addresses with any phone numbers related to that address. Data cleaning may also involve harmonization (or normalization) of data, which is the process of bringing together data of "varying file formats, name conventions, and columns", and transforming it into one cohesive data set; a simple example is the expansion of abbreviations.

SUMMARY

Embodiments of the present invention provide a computer system, a computer program product, and a method that comprises receiving transactional data from at least two users in a plurality of users; determining a pattern within the received transactional data based on a frequency-based domain conversion, wherein the pattern is associated with a determined periodicity; determining a delay within the received transactional data by identifying contextual factors associated with the received transactional data and measuring an amount of time between each identified contextual factors within a plurality of identified contextual factors using a signal processing algorithm; aligning the received transactional data from the at least two users by placing at least two signal forms associated based on the determined delay within the received transactional data at a same point; and generating a line graph depicting the aligned transactional data.

DETAILED DESCRIPTION

Embodiments of the present invention recognize the need for an improvement to data cleaning technology systems due to the amount of time and resources needed to clean data that is defined as complex. In this embodiment, complex data is defined as raw data with multiple data points and each data point requiring a generated data pipeline for data cleaning. Current data cleaning technology systems within a financial crime arena regulate, observe, and analyze data transactions for a predetermined amount of time, which exhausts a larger number of resources to regulate, observe, and analyze data transactions for any longer period of time than the predetermined amount of time customarily affixed to these data transactions. Furthermore, data cleaning technology systems lack an ability to identify patterns and determine periodicities of data within an efficient timely manner. Embodiments of the present invention improve the efficiency in time and resources of data cleaning technology systems by standardizing a transaction time sequence data to form a transaction signal for use in identifying patterns from the financial transaction time series. The conversion of data include one or more of: 1) standardizing the transaction signal by transforming the drat data from a time-based domain to a frequency-based domain; 2) determining a lag between a vector representation of the any two signals using signal processing techniques to align vectors to measure the similarity signals; and 3) aligning signals based on the determined lag. Embodiments of the present invention receive a plurality of transaction time series data for a plurality of transacting entities, each transaction time sequence data being a series of event occurring over different time scales. For each of the plurality of transaction time sequence data, embodiments of the present invention determine signal pattern based on an alignment of the transaction time sequence data to determine a delay between signals by applying a at least one signal processing technique. Embodiments of the present invention identifies identify the signal pattern within the transformed frequency-based domain based on a known fraud pattern signal.

Figure 1:
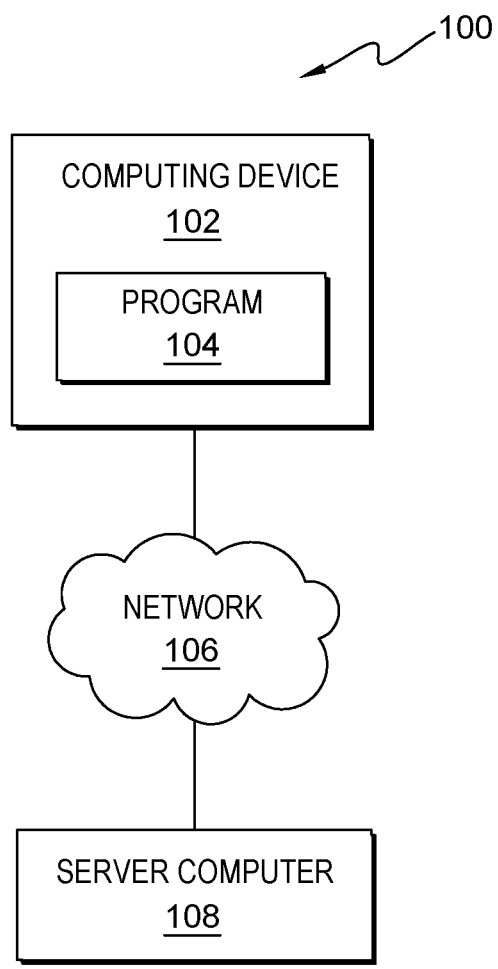
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108.

The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 aligns at least two data sets to either have the same starting point or same ending point that are separated by a delay. In this embodiment, the program 104 applies a normalized cross-correlation algorithm on two discrete transaction time sequence data by measuring a similarity between at least two vectors as a function of a lag. In this embodiment, the program 104 estimates a delay for an alignment that is given by the lag, which the normalized cross-correlation designates as the largest absolute value. In this embodiment, the program 104 receives data from at least two users; determines a delay within the received data using a cross-correlation algorithm; determines a pattern within the received data based on determined delay; and algins received data from at least two users in response to estimating a delay associated with the determined pattern. In this embodiment, the program 104 estimates the delay associated with the determined pattern by identifying an average delay associated with the determined pattern and comparing the identified average delay to the lag. In this embodiment, the program 104 determines a pattern based on the determined delay by measuring a similarity between a transaction vector and shifted copies of the transaction vector. In this embodiment, the program 104 measures the similarity by identifying factors associated with the transaction vector. For example, the program identifies duration, starting point, and ending point associated with the transaction vector to measure the similarity. In this embodiment, the program 104 estimates the determined delay by inverting the shifted copies of the transaction vector and converting the transaction vector into a numerical value. In this embodiment, the program 104 inverts the shifted copies by placing each transaction vector in a position that aligns with the determined delay. For example, the program 104 inverts shifted copy A and shifted copy B to end at the same point based on the five second determined delay associated with the received data. In this embodiment, the program 104 converts the determined delay associated with the inverted shifted copies of the transaction into a numerical value by placing the determined delay on a scale with a range of one to ten, where the range is scalable with the form of received data. For example, the scale has a range of one to ten seconds. In another example, the scale has a range of one to ten months. In this embodiment, the program 104 identifies the predetermined threshold of lag associated with each transaction vector and places a numerical value associated with the predetermined threshold of lag on the scale for comparison. For example, the program 104 identifies the predetermined threshold of lag associated with the received data as 7 seconds and the numerical value associated with the inverted shifted copies as 9 seconds; then the program 104 determines that the estimated delay meets or exceeds the predetermined threshold of lag, which results in the program 104 aligning the received data. In this embodiment, program 104 defines the inverted shifted copies of the transaction vector as a lag. In this embodiment, the program 104 generates a line graph depicting the aligned received data within a user interface display. In this embodiment, the program 104 transmits the generated line graph to a server computing device 108 via a network 106. In another embodiment, the program 104 transmits the generated line graph to a computing device 102 associated with a bank, company, or corporation.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
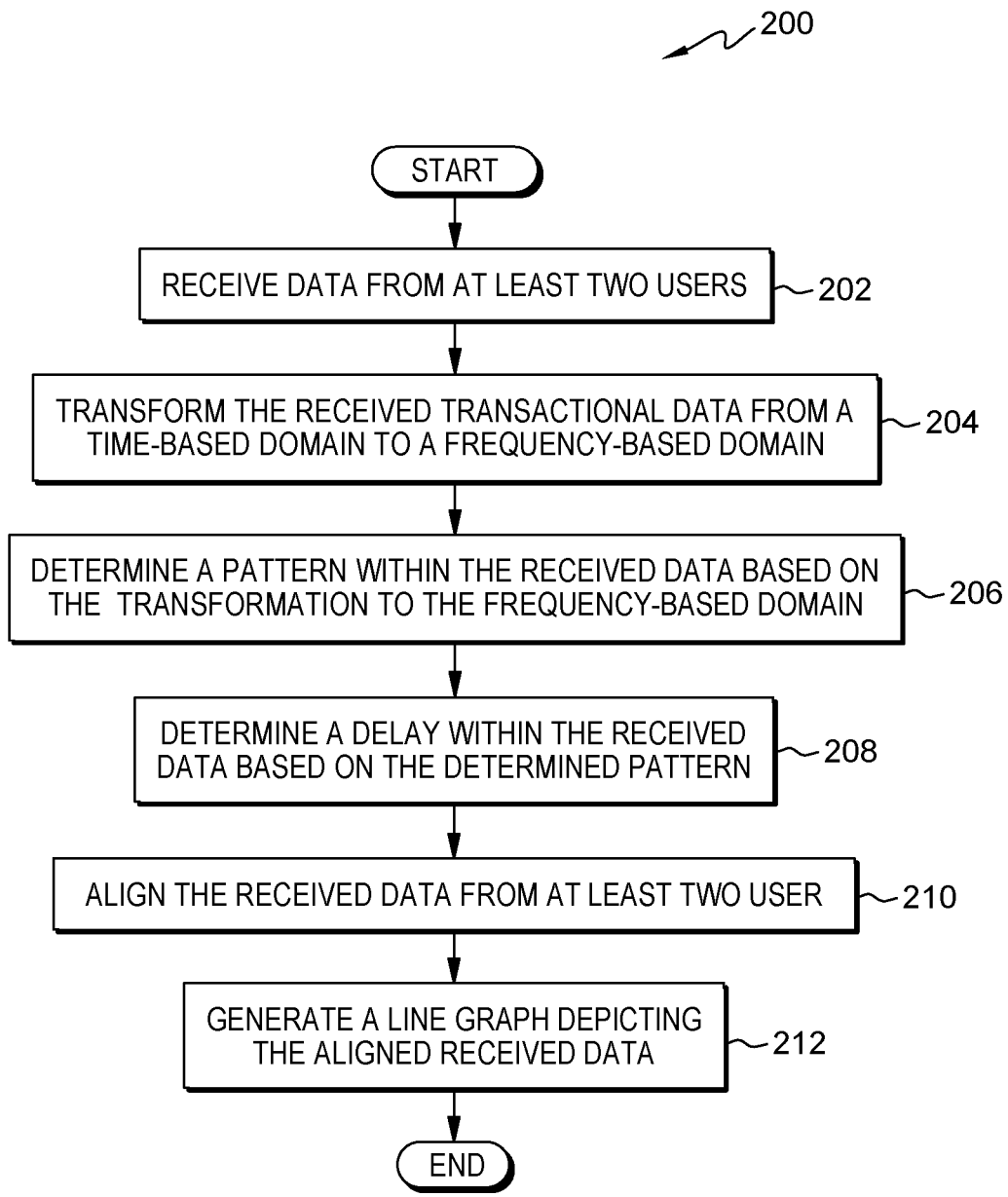
FIG. 2 is a flowchart illustrating operational steps for determining a lag between a signal representation of any two time-based transaction data sets, in accordance with at least one embodiment of the present invention.

FIG. 2 is a flowchart 200 illustrating operational steps for determining a lag between a signal representation of at least two transactional time series, in accordance with at least one embodiment of the present invention.

In step 202, the program 104 receives transactional data from at least two users. In this embodiment, the program 104 receives transactional data from at least two users in a plurality of users. In this embodiment, the program 104 defines transactional data as data that contains a time dimension with a timeliness to it, which becomes less relevant over time. For example, the program 104 receives a deposit for $5,000 from an account associated with a user that becomes void if not processed within 48 hours. In this embodiment and in a subsequent step, the time domain is converted into a frequency domain. In this embodiment, transactional data may be procedural data, financial data, or other forms of data that contain a timestamp. In this embodiment, the program 104 receives opt-in/opt-out permission from the user prior to receiving data, where the opt-in/opt-out permission allows a user to terminate permission for the program 104 to receive any data associated with the user at any time. For example, the program 104 receives financial transactional data transmitted from the user to a bank associated with the user, and the data contains an amount transmitted and the time of the transmissions.

In step 204, the program 104 transforms the received transactional data from a time-based domain to a frequency-based domain. In this embodiment, the program 104 transforms the received transactional data from a time-based domain to a frequency-based domain by utilizing the following equation:

$$y_{k+1} = \Sigma_{j=0}^{n-1} w^{jk} x_{j+1} \quad (1)$$

With respect to equation (1), y is defined as the frequency series, k is defined as the wavenumber, which the number of complete waves that fit in an interval, w is defined as the number of samples, j is defined as the square root of −1, and x is defined as the timer series. In this embodiment, the program 104 utilizes equation (1) to transform or convert the received transactional data from a time function to a frequency function. In this embodiment, the program 104 defines the equation as a mathematical transform that decomposes a function into its constituent frequencies.

In step 206, the program 104 determines a pattern within the received data based on the transformation to the frequency-based domain. In this embodiment, the program 104 determines a pattern within the received data by identifying a known fraud signal within the transformed transactional data within the frequency-based domain. In this embodiment, the program 104 defines the known fraud signal as a signal that was associated with a fraudulent transaction from a previous time period. In this embodiment, the program 104 identifies the known fraud signal within the transformed transactional data by determining a periodicity associated with the received data for each respective user. In this embodiment, the program 104 defines the determined periodicity as the calculated frequency of transactions occurring for a user over a concentrated period of time. In this embodiment, the program 104 determines a pattern by measuring a similarity between a transaction vector (such as transaction amount or time of transaction) and the known fraud signal. For example, the program 104 determines that an account associated with user B consistently withdrawals $5,000 three days after user A deposits $5,000 in an account associated with user A.

In this embodiment, the periodicity correlates with the number of identified peaks within the calculated auto-variance. For example, the larger the number of identified peaks within the calculated signal associated with the transaction vector, the higher the periodicity of the lag. In this embodiment, the program 104 determines a pattern based on the received information by determining a transactional vector. In another embodiment, the program 104 defines the transactional vector as a variable that has an impact on the calculation of the signal strength. For example, the program 104 identifies transaction amount, transaction frequency, and the number of users associated with an account as transactional vectors. In another embodiment, the program 104 calculates the transactional vector associated with an account of a user by dividing the number of transactions occurring over a concentrated fixed amount of time. In this embodiment, the program 104 determined the transactional vector as the transactional frequency. In another embodiment, the program 104 traces a destination and origin of a transactional vector in response to determining a transaction vector meets or exceeds the predetermined threshold of calculated signal strength.

In step 208, the program 104 determines a delay within the received data based on the determined pattern. In this embodiment, the program 104 determines a delay within the received data by identifying contextual factors associated with the received data based on an analysis of the transactional data and the known fraud signal and measuring a distance between similar identified contextual factors using a signal processing algorithm. In this embodiment, the program 104 defines the determined delay associated with the received transactional data as a lag. In this embodiment, the program 104 defines contextual factors as any factor that has an impact (positive or negative) on the determined pattern of the received data. For example, contextual factors include a starting timestamp, an ending timestamp, a calendar date, a transaction amount, details associated with the user, details associated with an account of the user, stock market trends, inflation rates, and global currency exchange rates. In another embodiment, the contextual factor is data within the received transactional data that results in a change in the determined pattern. In this embodiment, the program 104 identifies contextual factors within the received data by identifying indicative markers associated with each respective user. For example, the program 104 identifies transactional amount and time of transaction as contextual factors associated with the received data. For example, the program 104 measures the shift as 5 seconds when a first transactional signal has a time stamp of 4:00 minutes remaining in a sporting event and a second transactional signal has a time stamp of 3:55 minutes remaining in the same sporting event. In this embodiment, the program 104 defines the determined delay as the measured shift between the received data associated with the at least two users. In this embodiment, the program 104 measures the shift between the identified contextual factors associated with the received data for each respective user by using the cross-correlation algorithm. In this embodiment, the program 104 defines the shifted received data that is identical to previously received data as a lag. In this embodiment, the program 104 defines a lag as the distance a series of data is offset, and its sign determines which series of data is shifted. For example, the program 104 identifies that user A transmitted 6 transactions beginning on the October 7, and user B transmitted 6 identical transactions on October 21. Furthermore, the program 104 measures the delay as 14 days between the transactions.

In this embodiment, the program 104 determines the delay by comparing the contextual factors associated with the determined pattern (i.e., correlation coefficients) to the known fraud signal associated with the received data; converting the received transactional data from a time-based domain to a frequency-based domain by applying a signal processing algorithm, and calculating a signal strength associated with the frequency-based domain conversion of the received transactional data. In this embodiment, the program 104 defines the transaction vector as the measured difference between the determined delay and an estimated delay, which is proportional to the calculated signal strength.

In this embodiment, the program 104 compares the correlation coefficients to the known fraud signal by matching a value associated with each correlation coefficient and the determined pattern. In another embodiment and in response to the correlation coefficients failing to match the lag, the program 104 scales the values of each correlation coefficient and the lag In this embodiment, the program 104 determines the transaction vector and the calculated signal strength associated with the received transactional data based on the comparison of the identified contextual factors.

In this embodiment and in response to applying the signal processing algorithm, the program 104 determines a transaction vector associated with the transactional received data based on the comparison of the correlation coefficients and the determined delay associated with the transactional received data, wherein the correlation coefficients associated with the received transactional data are the measurement of time associated with the received transactional data and the predetermined threshold associated with the transactional received data.

In this embodiment, the program 104 calculates a signal strength associated with the transaction vector based on the conversion of the transactional data from a time measurement to a frequency measurement. In this embodiment, the program 104 identifies identical peaks within the transaction vector by detecting a point that meets or exceeds a predetermined threshold of transaction amount, where the predetermined threshold of transaction amount is based on a value that is equal to or greater than an average transaction amount over a concentrated fixed amount of time day period. In this embodiment, the program 104 deduces a periodicity of the received data by determining a pattern of identified identical peaks meeting or exceeding the predetermined threshold of lag proportional the calculated signal strength based on the transactional vector. For example, the program 104 determines that pattern associate with the account of user A based on the lag associated with received transactional data that is 9 days, which exceed the predetermined threshold of lag of 3 days associated with the calculated signal strength of 1.

In step 210, the program 104 aligns the received data from the at least two users. In this embodiment, the program 104 aligns the received data from the at least two users by removing the determined delay by placing the received transactional data the same starting point. In another embodiment, the program 104 may remove the determined delay of the received transactional data by placing the received transactional data in the same ending point. In this embodiment, the program 104 defines the determined delay as a lag. In this embodiment and in response to removing the lag, the program 104 places the received data in an identical starting point. In this embodiment, the program 104 estimates a delay associated with the received data for each respective user based on the determined delay and determined pattern of the received data by calculating the largest absolute value of the determined delay associated with the received transactional data. For example, the program 104 identifies the largest delay within the received transactional data associated with the account for user A is 30 days, thus estimates the delay for future transactions as 30 days. In this example, the program 104 may decrease the estimated delay but may not increase the estimated delay; therefore, the estimated delay is defined as the largest absolute value of the determined lag within the received transactional data.

In this embodiment and in response to estimating the delay, the program 104 aligns received data from the at least two users and aligns any future received data based on the estimation of the delay. In this embodiment, the program 104 estimates the delay associated with the determined pattern by identifying an average delay associated with the determined pattern and comparing the identified average delay to the lag. In this embodiment, the program 104 predicts the estimated delay based on the comparison of the identified average delay and the lag, wherein the program 104 predicts the estimated delay by analyzing the identified average delay associated with the determined pattern by using a machine learning algorithm and an artificial intelligence algorithm. In this embodiment, the program 104 defines absolute value as the magnitude of a real number without regard to its sign. For example, the program 104 algins the transactional data of user A and user B to start at the same point.

In step 212, the program 104 generates a line graph depicting the aligned received data. In this embodiment and in response to aligned in the received data, the program 104 generates a line graph for each respective user and then compiles each generated line graph into a single generated line graph. In this embodiment, the program 104 generates the line graph with an x-axis that represents the number of samples or transactions associated with the received data. In this embodiment, the program 104 generates the line graph with a y-axis that represents transaction signal. In this embodiment, the program 104 defines both the number of samples and transaction signal as transaction vectors that may be calculated and compared. In this embodiment, the program 104 transmits the generated line graph associated with the received to a user interface display within a computing device 102 associated with a bank, a company, or a corporation. In another embodiment, the program 104 transmits the generated line graph to a server computing device 109 via a network 106 to be stored for future use and reference.

Figure 3:
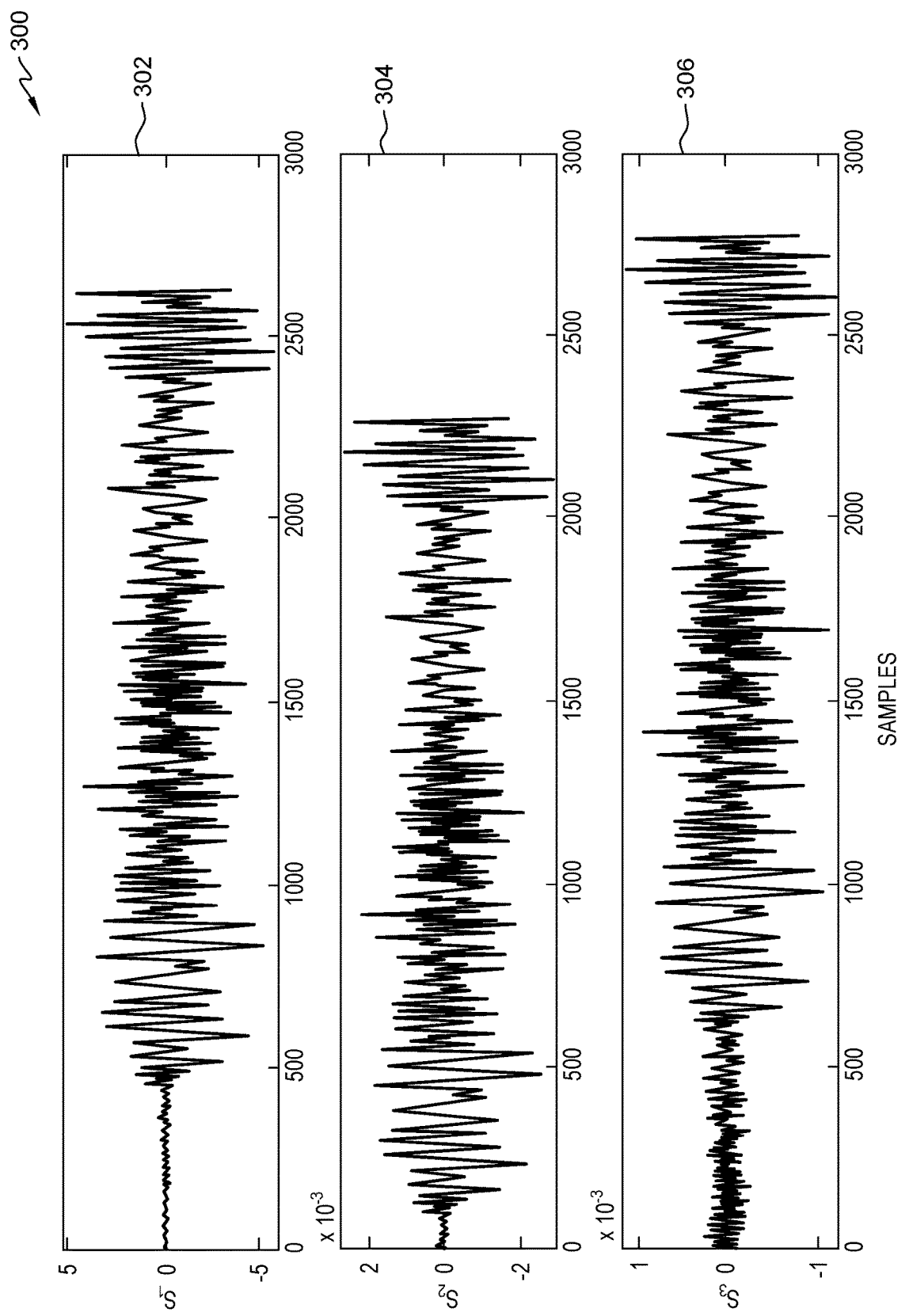
FIG. 3 is an exemplary diagram illustrating measuring a similarity between signals by applying a signal processing algorithm on at least two vectors, in accordance with at least one embodiment of the present invention.

FIG. 3 is an exemplary generated line graph depicting measuring a similarity in transaction signal within the received data in response to the application of the cross-correlation algorithm and alignment, in accordance with at least one embodiment of the present invention.

In this embodiment, the program 104 defines the x-axis as a sample value, where this sample value is defined as the transaction amount associated with the received data. In this embodiment, the program 104 defines the y-axis as number of transactions. In line graph 302, the program 104 defines the range of the x-axis as having a minimum value of 0 and a maximum value of 3000. In line graph 302, the program 104 defines the range of the y-axis as of −5 to 5, wherein negative values are associated with sent transactions and positive values are associated with received transactions. In this embodiment, the program 104 generates the line graph 302 to depict the determined pattern or transactional frequency associated with the received data for each respective user. In line graph 304, the program 104 defines the range of the x-axis as the same, but the program 104 defines the range of the y-axis as −0.002 to 0.002. In this embodiment and in response to the estimating a delay and aligning the received data for the multiple users, the program 104 defines a narrower range based on a more focused and refined generated line graph. In this embodiment, the program 104 removes lagged information and aligns the received data to an identical starting point, therefore, the number of transactions is the same number. In this embodiment, the program 104 maximizes the transaction vector by removing the lagged data and aligning the received data in response to removing the data. Thus, line graph 304 is a zoomed-in crop of line graph 302. In line graph 306, the program 104 compiles each generated line graph based on the received data for each respective user into a transaction signal. In line graph 306, the program 104 defines the range of the x-axis as the same, but the program 104 defines the range of the y-axis as −0.001 to 0.001. In this embodiment, the compiled generated line graph 306 that is associated with the transaction signal does not remove any lagged data. In this embodiment, the program 104 depicts that the transaction signal is proportional to a transaction vector that meets or exceeds a predetermined threshold amount, leading to the tracing and prevention of completion of fraudulent transactions.

Figure 4:
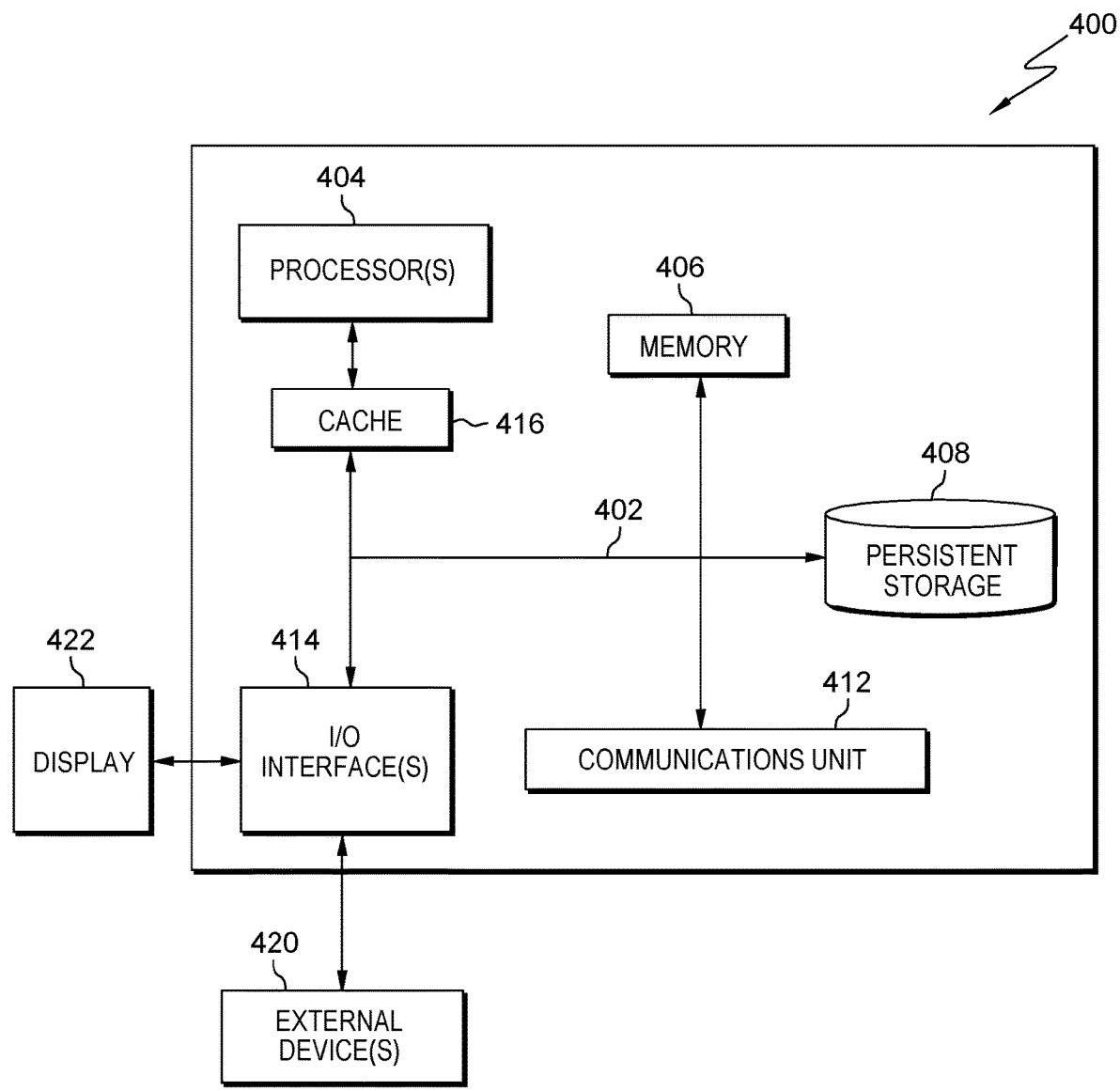
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving transactional data by a computing device, the transactional data received from at least two users in a plurality of users, the transactional data comprises at least one timestamp;
    identifying by the computing device, a known fraudulent signal within the received transactional data, the known fraudulent signal comprises a signal that was associated with a fraudulent transaction from a previous time period;
    determining by the computing device, a pattern within the received transactional data using a computer-based frequency-based domain conversion, where the frequency-based domain conversion uses a Fourier transformation algorithm to decompose a function into its constituent frequencies, wherein the pattern is associated with a determined periodicity, and wherein the pattern is based in part on the identified known fraudulent signal;
    determining by the computing device, a delay within the received transactional data by identifying contextual factors associated with the received transactional data based on an analysis of the received transaction data and the known fraudulent signal and measuring an amount of time between each identified contextual factors within a plurality of identified contextual factors using a computer-based signal processing algorithm, where a contextual factor is a factor having an impact on the determined pattern within the transactional data and comprises at least one of a starting timestamp and an ending timestamp;
    aligning by the computing device, the received transactional data from the at least two users by placing at least two signal forms associated based on the determined delay within the received transactional data at a same point;
    generating a line graph depicting the aligned transactional data; and
    transmitting the generated line graph to a user interface display device.

2. The computer-implemented method of claim 1, wherein determining the pattern within the received transactional data comprises:
    identifying the known fraudulent signal within the received transactional data based on a comparison to a database of known fraudulent signals, wherein the known fraudulent signal is associated with a previous fraudulent transaction; and
    determining a periodicity associated with the identified known fraudulent signal within the received transactional data.

3. The computer-implemented method of claim 2, wherein determining the periodicity comprises:
    calculating a frequency of the identified known fraudulent signal occurring within the received transactional data over a period of predetermined time; and
    measuring a difference between the calculated frequency associated with the identified known fraudulent signal to a plurality of transactional vectors, wherein a transactional vector is a data point that provides additional information on the received transactional data such as transaction amount.

4. The computer-implemented method of claim 1, wherein determining the delay comprises:
    identifying a plurality of contextual factors associated with the received transactional data based on an analysis of the determined pattern of the received data, wherein the contextual factors are selected from a group of factors consisting of a starting timestamp, an ending timestamp, a calendar date, a transaction amount, details associated with a user of the at least two users, details associated with an account of the user, stock market trends, inflation rates, and global currency exchange rates;

comparing each of the identified contextual factors within the plurality of contextual factors to an identified known fraudulent stored in an external database within a server computing device;

converting the identified contextual factors that matched the identified known fraudulent signal from a time-based domain to a frequency-based domain using the signal processing algorithm, wherein at least one identified contextual factor is required to match the identified known fraudulent signal; and calculating a signal strength associated with the received transactional data based on a result of the conversion of the identified contextual factors that matched the identified known fraudulent data to the frequency-based domain.

5. The computer-implemented method of claim 4, wherein the contextual factor is data within the received transactional data that results in a change in the determined pattern.

6. The computer-implemented method of claim 4, wherein the calculated signal strength is proportional to a calculated frequency associated with a determined periodicity associated with the received transactional data.

7. The computer-implemented method of claim 1, wherein aligning the received transactional data from the at least two users comprises removing the determined delay associated with the received transactional data to place the received transactional data from each user at the same point.

8. A computer program product comprising:
one or more computer readable storage media and program instructions stored on the one or more computer readable storage media, the program instructions when executed on a computing device cause the computing device to:
receive transactional data from at least two users in a plurality of users, the transactional data comprises at least one timestamp;
identify a known fraudulent signal within the received transactional data, the known fraudulent signal comprises a signal that was associated with a fraudulent transaction from a previous time period;
determine a pattern within the received transactional data using a computer-based frequency-based domain conversion, where the frequency-based domain conversion uses a Fourier transformation algorithm to decompose a function into its constituent frequencies, wherein the pattern is associated with a determined periodicity, and wherein the pattern is based in part on the identified known fraudulent signal;
determine a delay within the received transactional data by identifying contextual factors associated with the received transactional data based on an analysis of the received transaction data and the known fraudulent signal and measuring an amount of time between each identified contextual factors within a plurality of identified contextual factors using a computer-based signal processing algorithm, where a contextual factor is a factor having an impact on the determined pattern within the transactional data and comprises at least one of a starting timestamp and an ending timestamp;
align the received transactional data from the at least two users by placing at least two signal forms associated based on the determined delay within the received transactional data at a same point;
generate a line graph depicting the aligned transactional data; and
transmit the generated line graph to a user interface display device.

9. The computer program product of claim 8, wherein the program instructions to determine the pattern within the received transactional data when executed on the computing device further cause the computing device to:
identify the known fraudulent signal within the received transactional data based on a comparison to a database of known fraudulent signals, wherein the known fraudulent signal is associated with a previous fraudulent transaction; and
determine a periodicity associated with the identified known fraudulent signal within the received transactional data.

10. The computer program product of claim 9, wherein the program instructions to determine the periodicity, when executed on the computing device cause the computing device to:
calculate a frequency of the identified known fraudulent signal occurring within the received transactional data over a period of predetermined time; and
measure a difference between the calculated frequency associated with the identified known fraudulent signal to a plurality of transactional vectors, wherein a transactional vector is a data point that provides additional information on the received transactional data such as transaction amount.

11. The computer program product of claim 8, wherein the program instructions to determine the delay, when executed on the computing device cause the computing device to:
identify a plurality of contextual factors associated with the received transactional data based on an analysis of the determined pattern of the received data;
compare each of the identified contextual factors within the plurality of contextual factors to an identified known fraudulent stored in an external database within a server computing device;
convert the identified contextual factors that matched the identified known fraudulent signal from a time-based domain to a frequency-based domain using the signal processing algorithm, wherein at least one identified contextual factor is required to match the identified known fraudulent signal; and
calculate a signal strength associated with the received transactional data based on a result of the conversion of the identified contextual factors that matched the identified known fraudulent data to the frequency-based domain.

12. The computer program product of claim 11, wherein the contextual factor is data within the received transactional data that results in a change in the determined pattern.

13. The computer program product of claim 11, wherein the calculated signal strength is proportional to a calculated frequency associated with a determined periodicity associated with the received transactional data.

14. The computer program product of claim 8, wherein the program instructions to align the received transactional data from the at least two users, when executed on the computing device cause the computing device to remove the determined delay associated with the received transactional data to place the received transactional data from each user at the same point.

15. A computer system comprising:
one or more computer processors;
one or more computer readable storage media; and
program instructions stored on the one or more computer readable storage media for execution by at least one of the one or more processors, when executed on the one or more processors cause the one or more processors to:
receive transactional data from at least two users in a plurality of users, the transactional data comprises at least one timestamp;
identify a known fraudulent signal within the received transactional data, the known fraudulent signal comprises a signal that was associated with a fraudulent transaction from a previous time period;
determine a pattern within the received transactional data using a computer-based frequency-based domain conversion, where the frequency-based domain conversion uses a Fourier transformation algorithm to decompose a function into its constituent frequencies, wherein the pattern is associated with a determined periodicity, and wherein the pattern is based in part on the identified known fraudulent signal;
determine a delay within the received transactional data by identifying contextual factors associated with the received transactional data based on an analysis of the received transaction data and the known fraudulent signal and measuring an amount of time between each identified contextual factors within a plurality of identified contextual factors using a signal processing algorithm and comprises at least one of a starting timestamp and an ending timestamp;
align the received transactional data from the at least two users by placing at least two signal forms associated based on the determined delay within the received transactional data at a same point; and
generate a line graph depicting the aligned transactional data.

16. The computer system of claim 15, wherein the program instructions to determine the pattern within the received transactional data, when executed on the one or more processors cause the one or more processors to:
identify the known fraudulent signal within the received transactional data based on a comparison to a database of known fraudulent signals; and
determine a periodicity associated with the identified known fraudulent signal within the received transactional data.

17. The computer system of claim 16, wherein the program instructions to determine the periodicity, when executed on the one or more processors cause the one or more processors to:
calculate a frequency of the identified known fraudulent signal occurring within the received transactional data over a period of predetermined time; and
measure a difference between the calculated frequency associated with the identified known fraudulent signal to a plurality of transactional vectors, wherein a transactional vector is a data point that provides additional information on the received transactional data such as transaction amount.

* * * * *